(12) United States Patent
Leppänen et al.

(10) Patent No.: US 10,798,518 B2
(45) Date of Patent: Oct. 6, 2020

(54) APPARATUS AND ASSOCIATED METHODS

(71) Applicant: Nokia Technologies Oy, Espoo (FI)

(72) Inventors: Jussi Leppänen, Tampere (FI); Arto Lehtiniemi, Lempäälä (FI); Antti Eronen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/472,838

(22) PCT Filed: Dec. 15, 2017

(86) PCT No.: PCT/FI2017/050904
§ 371 (c)(1),
(2) Date: Jun. 21, 2019

(87) PCT Pub. No.: WO2018/122452
PCT Pub. Date: Jul. 5, 2018

(65) Prior Publication Data
US 2019/0335292 A1    Oct. 31, 2019

(30) Foreign Application Priority Data

Dec. 30, 2016    (EP) ..................... 16207445

(51) Int. Cl.
*H04S 7/00* (2006.01)
*G06F 3/16* (2006.01)
(Continued)

(52) U.S. Cl.
CPC ................ *H04S 7/40* (2013.01); *G06F 3/165* (2013.01); *G10H 1/0025* (2013.01); *H04R 5/04* (2013.01); *G10H 2220/131* (2013.01)

(58) Field of Classification Search
CPC . H04S 7/00; H04S 7/303; H04S 7/304; H04S 7/307; H04S 7/40; H04S 2400/11;
(Continued)

(56) References Cited

U.S. PATENT DOCUMENTS 7,876,914 B2 * 1/2011 Grosvenor ............. H04H 60/47
381/122
8,983,089 B1   3/2015 Chu et al.
(Continued)

OTHER PUBLICATIONS

Shah et al., "Metrics for Measuring Ideation Effectiveness", Design Studies, vol. 24, No. 2, Mar. 2003, pp. 111-134.
(Continued)

*Primary Examiner* — Thang V Tran
(74) *Attorney, Agent, or Firm* — Alston & Bird LLP (57) ABSTRACT

Apparatus configured to, based on visual and audio content captured of a scene comprising at least one audio source and the content including at least two audio tracks, each audio track comprising audio captured by a respective one of at least two audio capture devices located at different locations in the scene, and audio-capture-direction information indicative of at least the direction towards each of the audio capture devices; provide for display of a user selectable audio-capture-location graphic for each of the audio tracks, wherein each audio-capture-location graphic is associated with one of the audio tracks and visually associated with the audio source wherein the form or position of the audio-capture-location graphics is indicative of the direction towards the audio source capture device and wherein based on selection of one of the audio-capture-location graphics, provide for audible presentation of the audio track associated therewith.

20 Claims, 3 Drawing Sheets

(51) Int. Cl.
*H04R 5/04* (2006.01)
*G10H 5/00* (2006.01)
*G10H 1/00* (2006.01)

(58) Field of Classification Search
CPC ... H04S 2400/15; H04S 2420/01; H04R 3/00; H04R 3/005; H04R 3/04; H04R 5/00; H04R 5/027; H04R 5/033; H04R 5/04; H04R 2420/01; G06F 3/011; G06F 3/012; G06F 3/017; G06F 3/16; G06F 3/04815; G06F 1/163; G10H 1/0025; G10H 2220/131; G06T 19/00; G06T 19/006; G06T 19/20; G06T 11/60
See application file for complete search history.

(56) References Cited

U.S. PATENT DOCUMENTS

| | | | | |
|---|---|---|---|---|
| 9,363,569 | B1* | 6/2016 | van Hoff | H04N 21/2668 |
| 9,661,439 | B2* | 5/2017 | Yamashita | G06F 21/32 |
| 10,326,978 | B2* | 6/2019 | Ostrover | H04S 7/302 |
| 2003/0091204 | A1 | 5/2003 | Gibson | |
| 2006/0212147 | A1* | 9/2006 | McGrath | H04L 67/38 |
| | | | | 700/94 |
| 2014/0093855 | A1* | 4/2014 | Waldman | G09B 5/065 |
| | | | | 434/308 |
| 2016/0119734 | A1 | 4/2016 | Sladeczek et al. | |
| 2016/0379660 | A1* | 12/2016 | Wright | H04S 1/002 |
| | | | | 381/57 |
| 2017/0078825 | A1* | 3/2017 | Mangiat | H04S 7/304 |
| 2017/0188173 | A1* | 6/2017 | Ranieri | H04S 7/306 |
| 2018/0047372 | A1* | 2/2018 | Scallie | G10H 1/0008 |
| 2018/0275861 | A1* | 9/2018 | Mate | G06F 3/011 |

OTHER PUBLICATIONS

Smith., "Idea-Generation Techniques: A Formulary Of Active Ingredients", Journal of creative behavior, vol. 32, No. 2, 1998, pp. 107-133.
Smith, "Towards a logic of innovation", The International Handbook on Innovation, Dec. 2003. p. 347-365.
Kimura et al., "Sound Field Auralization System in Free Listening Positions Using Wave Field Synthesis and Head Related Transfer Functions", Forum Acusticum, 2005, 6 pages.
Extended European Search Report received for corresponding European Patent Application No. 16207445.4, dated Jul. 7, 2017, 10 pages.
International Search Report and Written Opinion received for corresponding Patent Cooperation Treaty Application No. PCT/FI2017/050904, dated Mar. 26, 2018, 14 pages.
Office Action for European Application No. 16207445.4 dated Jul. 30, 2020, 20 pages.

* cited by examiner

700 — based on visual and audio content captured of a scene, the scene comprising at least one audio source and the content including at least two audio tracks, each audio track comprising, at least in part, audio from said at least one audio source captured by an audio capture device located at a different location in the scene, and audio-capture-direction information indicative of at least the direction towards each of the audio capture devices from the audio source;

701 — providing for display of a user selectable audio-capture-location graphic for each of the audio tracks, wherein each audio-capture-location graphic is associated with at least one of the audio tracks and visually associated with the at least one audio source wherein one or more of the form and position of the audio-capture-location graphics is indicative of the direction towards the audio source capture device and wherein based on selection of one of the audio-capture-location graphics, provide for audible presentation of the audio track associated therewith.

APPARATUS AND ASSOCIATED METHODS

RELATED APPLICATION

This application was originally filed as Patent Cooperation Treaty Application No. PCT/FI2017/050904 filed Dec. 15, 2017 which claims priority benefit to EP Patent Application No. 16207445.4, filed Dec. 30, 2016.

TECHNICAL FIELD

The present disclosure relates to visual and audio content of a scene wherein audio of the scene is captured from a plurality of different locations in the scene. The present disclosure may also be in the field of visual and audio content that comprises virtual reality content. Associated methods, computer programs and apparatus is also disclosed. Certain disclosed aspects/examples relate to portable electronic devices.

BACKGROUND

Audio of a scene may be captured by audio capture devices from a plurality of locations in the scene. The mixing of audio from a plurality of audio capture devices may be difficult.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
  at least one processor; and
  at least one memory including computer program code, the at least one memory and the computer program code configured to, with the at least one processor, cause the apparatus to perform at least the following:
  based on visual and audio content captured of a scene, the scene comprising at least one audio source and the content including at least two audio tracks, each audio track comprising, at least in part, audio from said at least one audio source captured by a respective one of at least two audio capture devices located at different locations in the scene, and audio-capture-direction information indicative of at least the direction towards each of the audio capture devices from the audio source;
  provide for display of a user selectable audio-capture-location graphic for each of the audio tracks, wherein each audio-capture-location graphic is associated with at least one of the audio tracks and visually associated with the at least one audio source as represented in the visual content wherein one or more of the form and position of the audio-capture-location graphics is indicative of the direction towards the audio source capture device and wherein based on selection of one of the audio-capture-location graphics, provide for audible presentation of the audio track associated therewith.

Thus, in one or more examples, the user selectable audio-capture-location graphics provide for selection of audio that may be listened to by the user that is captured at least from different "listening" locations in the scene compared to a current point of view provided for visual presentation to the user. Thus, the user may listen to audio captured from locations different to their current point of view in the visual and audio content. In one or more examples, by default, the audio presented to the user may be based on their current point of view and may comprise a combination of the audio tracks but on user selection, the selected audio track is provided for presentation without the other audio tracks or at a greater relative volume.

In one or more embodiments, on selection of the one of the audio-capture-location graphics, the audio track associated therewith is provided for audible presentation in preference to audible presentation of the other audio tracks. Accordingly, in one or more embodiments, the other audio tracks may be muted or presented at a lower volume relative to the audio track selected by way of its associated audio-capture-location graphic.

In one or more examples, the audio-capture-location graphics are provided for display overlaid over the visual content of the visual and audio content captured of the scene.

In one or more examples, the audio track associated with the selected audio-capture-location graphic is provided for audible presentation without the provision of any visual content captured by the audio capture device with which the audio track is associated. In one or more examples, one or more of the audio capture devices may be physically associated with a visual content capture device for capturing visual content along with the audio and the apparatus is configured to provide for separation of the audio from the visual content to provide solely for audible presentation of the audio.

In one or more embodiments, the apparatus is configured to provide for display of the user selectable audio-capture-location graphics further based on user selection of the audio source as represented in the visual and audio content captured of the scene. Thus, in one or more, examples, the apparatus may provide for display of the audio-capture-location graphics for a particular, selected audio source in response to the particular audio source of a plurality of audio sources being selected by the user.

In one or more embodiments, based on user selection of the audio source as represented in the visual and audio content captured of the scene, the apparatus is caused to provide for muting of the audio from audio sources other than the selected audio source.

In one or more examples, the audio tracks comprise spatial audio in which the direction towards the audio of the audio track is defined as part of the audio track, and wherein the apparatus is caused to provide for muting of the audio from directions other than the direction towards the selected audio source.

In one or more embodiments, based on user input associated with a particular one of the audio-capture-location graphics, the apparatus may be caused to provide for audible presentation of the audio track associated therewith with a change in volume.

In one or more embodiments, the user selection of one of the audio-capture-location graphics comprises part of a user selection that includes a plurality of audio-capture-location graphics and the apparatus is caused to provide for sequential audio presentation of the audio tracks associated with the selected plurality of audio-capture-location graphics.

In one or more examples, the user selection of the plurality of audio-capture-location graphics comprises a single gesture. In one or more examples, the user selection comprises a user drawn line that selects the plurality of audio-capture-location graphics by virtue of extending through them. In one or more examples, the duration of the sequential audio presentation of the audio tracks is based on the time the user took to draw the line.

In one or more embodiments, the visual and audio content comprises virtual reality content, wherein a virtual reality view presented to the user provides for viewing of at least a spatial portion of the virtual reality content at any one time.

In particular, in one or more examples, the provision of user selectable audio-capture-location graphics is useful when applied to VR content comprising free viewpoint virtual reality content where effective selection of audio tracks from different capture locations can provide an advantageous aural scene for consumption of VR where the virtual location of the point of view of the user in a VR space is user selected.

In one or more embodiments, providing for the audible presentation of the audio track comprises providing for audible presentation of the audio track with a spatial audio effect such that a perceived aural origin of the audio of the audio track corresponds to a position of the audio source as represented in the visual content of the scene.

In one or more examples, the one or more of the audio tracks comprise spatial audio in which the direction towards the audio is defined as part of the audio track, and wherein the apparatus is caused to present the spatial audio with the spatial audio effect to provide for perception of the audio of the spatial audio of the audio track as originating from directions of the audio sources in the visual content.

In one or more embodiments, based on selection of one or more of the audio-capture-location graphics, the apparatus is caused to provide for recordal of the one or more selected audio tracks as preferred audio tracks for subsequent audible presentation of the preferred audio track(s) by default to one or more of the user or a different user when watching the visual and audio content at a future time.

Thus, when the audio and visual content is provided for visual and audible presentation at a later time, upon presentation of the visual content of the audio source, the preferred audio track is provided for audible presentation in preference to any audio captured from a point of view of the visual content. The audible presentation of the preferred audio track may be based on, at the future time, a corresponding elapsed time through the visual and audio content (e.g. within a threshold of when the preferred audio track was selected). In one or more examples, the visual and audio content may be virtual reality content, and the audible presentation of the preferred audio track may be based on a virtual location of the user or different user at the future time corresponding to the virtual location of the user when the preferred audio track was selected as such. The virtual locations may correspond by virtue of there being less than a threshold virtual distance between them. This may be advantageous for free view point virtual reality where a user can freely control their virtual location in a three dimensional virtual reality space, the virtual reality content displayed in said virtual reality space.

The preferred audio track may be associated with the audio source, such that whenever the audio source is in view, the preferred audio tracks is provides in preference to any other audio track that contains audio from the audio source. In other examples, the preferred audio track is associated with the virtual location (or an area therearound) from which the user selected the preferred audio track as being the preferred audio track, such that when a user, at a future time, is virtually located in that virtual location or area, they are audibly presented with the preferred audio track.

In one or more embodiments, the visual and audio content comprises virtual reality content for display in a three-dimensional virtual reality space, the audio source viewable from a plurality of virtual points of view within the virtual reality space.

In one or more embodiments, the apparatus is caused to provide for recordal of the selected audio track as a preferred audio track at one of or a subset of the plurality of virtual points of view, for subsequent audible presentation of the preferred audio track by default to one or more of the user or a different user when watching the visual and audio content from said one of or a subset of the plurality of virtual points of view at the future time.

In one or more embodiments, the apparatus is further caused to provide for recordal of the selected audio track as a preferred audio track for a specified virtual area in the virtual reality space, for subsequent audible presentation of the preferred audio track by default to one or more of the user or a different user when watching the visual and audio content from within said specified virtual area at the future time.

In one or more examples, a virtual reality view presented to the user provides for viewing of at least a spatial portion of the virtual reality content at any one time and the audible presentation of the preferred audio track is further dependent on the virtual reality view including the audio source.

In one or more embodiments, the audio-capture-location graphics are provided for display overlaid over the visual content of the visual and audio content captured of the scene.

In a second aspect there is provided a method, the method comprising
    based on visual and audio content captured of a scene, the scene comprising at least one audio source and the content including at least two audio tracks, each audio track comprising, at least in part, audio from said at least one audio source captured by a respective one of at least two audio capture devices located at different locations in the scene, and audio-capture-direction information indicative of at least the direction towards each of the audio capture devices from the audio source;
    providing for display of a user selectable audio-capture-location graphic for each of the audio tracks, wherein each audio-capture-location graphic is associated with at least one of the audio tracks and visually associated with the at least one audio source as represented in the visual content wherein one or more of the form and position of the audio-capture-location graphics is indicative of the direction towards the audio source capture device and wherein based on selection of one of the audio-capture-location graphics, providing for audible presentation of the audio track associated therewith.

In a third aspect there is provided a computer readable medium comprising computer program code stored thereon, the computer readable medium and computer program code being configured to, when run on at least one processor, perform the method of:
    based on visual and audio content captured of a scene, the scene comprising at least one audio source and the content including at least two audio tracks, each audio track comprising, at least in part, audio from said at least one audio source captured by a respective one of at least two audio capture devices located at different locations in the scene, and audio-capture-direction information indicative of at least the direction towards each of the audio capture devices from the audio source;

providing for display of a user selectable audio-capture-location graphic for each of the audio tracks, wherein each audio-capture-location graphic is associated with at least one of the audio tracks and visually associated with the at least one audio source as represented in the visual content wherein one or more of the form and position of the audio-capture-location graphics is indicative of the direction towards the audio source capture device and wherein based on selection of one of the audio-capture-location graphics, providing for audible presentation of the audio track associated therewith.

In a fifth aspect there is provided an apparatus comprising:

at least one processor; and at least one memory including computer program code, the at least one memory and the computer program code configured to, with the at least one processor, cause the apparatus to perform at least the following:

based on visual and audio content captured of a scene, the scene comprising at least one audio source and the content including at least two audio tracks, each audio track comprising, at least in part, audio from said at least one audio source captured by a respective one of at least two audio capture devices located at different locations in the scene, and preferred audio track information defining, for a particular audio source, one or more preferred audio tracks for audible presentation to a user;

provide for visual and audio display of the visual and audio content wherein the audio track defined by the preferred audio track information is provided for audible presentation in preference to the other audio tracks based on one or more of;

i) said audio source being visible in a view presented to the user; and ii) a virtual point of view of the user being within an area of a virtual reality space defined as part of the preferred audio track information, wherein the visual and audio content comprises virtual reality content for display in said virtual reality space.

In a further aspect there is provided an apparatus, the apparatus comprising means configured to;

based on visual and audio content captured of a scene, the scene comprising at least one audio source and the content including at least two audio tracks, each audio track comprising, at least in part, audio from said at least one audio source captured by a respective one of at least two audio capture devices located at different locations in the scene, and audio-capture-direction information indicative of at least the direction towards each of the audio capture devices from the audio source;

provide for display of a user selectable audio-capture-location graphic for each of the audio tracks, wherein each audio-capture-location graphic is associated with at least one of the audio tracks and visually associated with the at least one audio source as represented in the visual content wherein one or more of the form and position of the audio-capture-location graphics is indicative of the direction towards the audio source capture device and wherein based on selection of one of the audio-capture-location graphics, provide for audible presentation of the audio track associated therewith.

In a further aspect there is provided an apparatus, the apparatus comprising means configured to;

based on visual and audio content captured of a scene, the scene comprising at least one audio source and the content including at least two audio tracks, each audio track comprising, at least in part, audio from said at least one audio source captured by a respective one of at least two audio capture devices located at different locations in the scene, and preferred audio track information defining, for a particular audio source, one or more preferred audio tracks for audible presentation to a user;

provide for visual and audio display of the visual and audio content wherein the audio track defined by the preferred audio track information is provided for audible presentation in preference to the other audio tracks based on one or more of;

i) said audio source being visible in a view presented to the user; and ii) a virtual point of view of the user being within an area of a virtual reality space defined as part of the preferred audio track information, wherein the visual and audio content comprises virtual reality content for display in said virtual reality space.

The present disclosure includes one or more corresponding aspects, examples or features in isolation or in various combinations whether or not specifically stated (including claimed) in that combination or in isolation. Corresponding means and corresponding functional units (e.g., function enabler, point of view determiner, display device, graphic renderer, user input receiver) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

The present disclosure relates to visual and audio content in general, although the embodiments described below relate to visual and audio content comprising virtual reality content for display in virtual reality. It will be appreciated that in one or more examples, the visual and audio content may comprise conventional video and audio rather than virtual reality content.

Virtual reality (VR) may use a VR display comprising a headset, such as glasses or goggles or virtual retinal display, or one or more display screens that surround, at least partly, a user to provide the user with an immersive virtual experience. A virtual reality apparatus, using the VR display, may present multimedia VR content representative of a scene to a user to simulate the user being virtually present within the scene. The virtual reality scene may replicate a real world scene to simulate the user being physically present at a real world location or the virtual reality scene may be computer generated or a combination of computer generated and imaged real world multimedia content. The virtual reality scene may be provided by a panoramic video (such as a panoramic live broadcast or pre-recorded content), comprising a video having a wide or 360° field of view (or more, such as above and/or below a horizontally oriented field of view). The user may be presented with a VR view of the scene and may, such as through movement of the VR display (i.e. headset), move the VR view to look around the scene at the VR content. Accordingly, a three-dimensional virtual reality space may be provided in which the virtual reality content is displayed and in which the user can look around and, optionally, explore by translation through the VR space.

The VR content provided to the user may comprise live or recorded images of the real world, captured by a VR content capture device, for example. A VR content capture device may be configured to capture VR content for display to one or more users. A VR content capture device may comprise one or more cameras and one or more (e.g. directional and/or ambient) microphones configured to capture the surrounding visual and aural scene from a point of view. An example VR content capture device is a Nokia OZO camera of Nokia Technologies Oy. Thus, a musical performance may be captured (and recorded) using a VR content capture device, which may be placed on stage, with the performers moving around it or from the point of view of an audience member. In each case a consumer of the VR content may be able to look around using the VR display of a VR apparatus to experience the performance at the point of view of the capture location as if they were present.

As the VR scene is typically spatially larger than a portion a user can view with the VR view presented on the VR display at any one time, the VR apparatus may provide for panning around of the VR view in the VR scene based on movement of a user's head or eyes. For example, the field of view in the horizontal plane of a VR display may be about 120° but the VR content may provide 360° video imagery. Thus, the field of view of the VR view provided by the VR display may be less than the total spatial extent of the VR content.

In one or more examples, the VR content may be such that a user may change the viewing direction of their VR view to look around the VR scene but the location of their point of view is outside their control and dependent on the point of view of the VR content capture device location when it captured the scene. In one or more examples, sometimes referred to as "free viewpoint" VR, the user is able to explore the VR space. The explorable VR space may be computer generated, such as rendered from 3-dimensional models, or may be generated from visual imagery of a scene from one or more VR content capture devices or a combination of the two. Thus, free viewpoint VR content may be such that a user may control the location of their point of view in the VR space as well as the viewing direction of their VR view to look around the VR space. When the user is at a virtual location in the VR space that corresponds to where the VR content was captured in the scene, then the user may be provided with the VR content from that content capture device. When the user virtually moves away from the VR content capture device location, the VR apparatus may provide for display of VR content from a different VR content capture device at a different location or provide for display of a combination of imagery from multiple content capture devices to simulate the view the user may see at their current virtual location. It will be appreciated that various techniques exist for simulating the view a user may receive at a point in the virtual space based on VR content captured at one or more VR content capture locations in a scene including: use of VR content from VR content capture devices at different locations; use of combinations of imagery from VR content capture devices at different locations; interpolation of visual imagery from one or more VR content capture devices at different locations; use of computer models of the scene to simulate a point of view location between VR content capture devices.

The virtual reality content may be provided with spatial audio having directional properties, such that the audio is perceived to originate from a point in the VR space, which may be linked to the imagery of the VR content. The spatial positioning of the audio may be provided by the degree to which audio is presented to each channel of a multichannel audio arrangement, as well as 3D audio effects, such as those that utilise a head related transfer function to create an spatial audio space in which audio can be positioned for presentation to a user.

Figure 1:
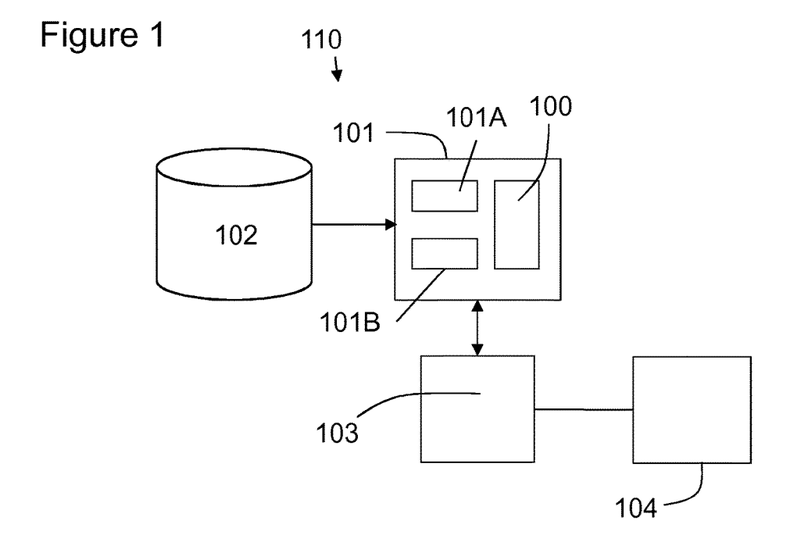
FIG. 1 illustrates an example embodiment of an apparatus.

The apparatus 100 may form part of or be in communication with a VR apparatus 101 for presenting VR content to a user. A store 102 is shown representing the VR content stored in a storage medium or transiently present on a data transmission bus as the VR content is captured and received by the VR apparatus 101. The VR content may be captured by at least one VR content capture device and may be live or recorded. A user may use a VR head set 103 or other VR display to view the VR content. The VR display 103, or more generally the VR apparatus 101, may be associated with headphones 104 or other multi-channel sound generating arrangement for presentation of spatial audio and/or ambient audio which does not have a perceived origin direction. In other embodiments, the VR apparatus 101 may be remote from the apparatus 100, and may be connected via a network, such as the Internet. The VR apparatus 101 may form part of the store 102 and, in one or more examples, transmit the VR content to the VR display 103 and headphones 104. In other embodiments, the VR apparatus 101 may be integral with the VR display 103 and/or headphones 104 and, as such, the apparatus 100 may be integral therewith or remote and in communication with the VR apparatus 101.

In this embodiment the apparatus 100 mentioned above may have or may be connected to only one processor 101A and one memory 101B but it will be appreciated that other embodiments may utilise more than one processor and/or more than one memory (e.g. same or different processor/memory types). Further, the apparatus 100 may be an Application Specific Integrated Circuit (ASIC). The apparatus 100 may be separate from and in communication with the VR apparatus 101 or, as in FIG. 1, may be integrated with the VR apparatus 101. The apparatus 100 and VR apparatus 101 may share the processor 101A and/or memory 101B or may be provided with separate processors and/or memories.

The processor 101A may be a general purpose processor dedicated to executing/processing information received from other components, such as the VR apparatus 101 and the apparatus 100, in accordance with instructions stored in the form of computer program code on the memory. The output signalling generated by such operations of the processor is provided onwards to further components, such as to the VR apparatus 101 for display of the required imagery described in more detail below.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the processor 101A and the memory 101B are all electrically connected to one another internally to allow for electrical communication between the respective components. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
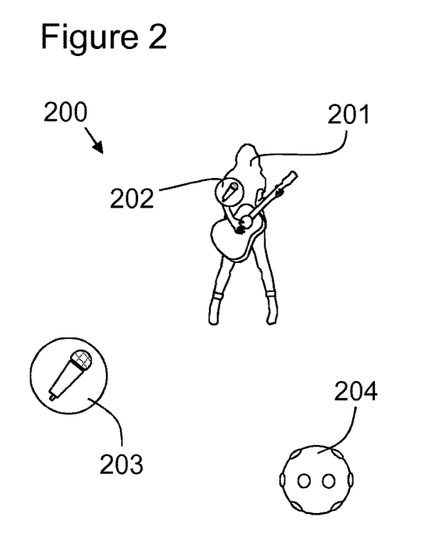
FIG. 2 illustrates an audio source in a real world scene and a plurality of audio-capture-devices.

FIG. 2 shows a real world scene 200 for capturing as visual and audio content. In this example, the visual and audio content is virtual reality content such that a user watching the resulting VR content may feel as if they were there in the scene 200. It will be appreciated that while the examples described herein primarily relate to the visual and audio content comprising virtual reality content, the visual and audio content may comprise, in one or more examples, conventionally captured "flat" content.

The scene 200 comprises one audio source 201 comprising a musician playing a guitar. It will be appreciated that the scene 200 may include more than one audio source. The guitar music or, more generally, audio from the audio source 201 is captured by a plurality of audio capture devices located at different positions in the scene 200. In this example, the musician 201 is wearing an audio capture device comprising a microphone 202. As the microphone is worn, such as a lavalier microphone, the physical location of the microphone 202 in the scene 200 is directly related to the physical position of the audio source 201. The audio from the audio source is also captured by a second audio capture device comprising microphone array 203. The microphone array 203 comprises a plurality of directional microphone arranged together. Thus, the location of the audio source 201 relative to the microphone array 203 may be determined based on the audio captured by the microphone array 203. For example, the direction information may be based on differences in the audio, such as volume, received at the different directional microphones of the array 203. In other examples, the microphone array 203 may instead comprise a general microphone configured to capture the ambient audio in its vicinity without directional information. A third audio capture device comprising a VR content capture device 204 (Nokia OZO VR camera, in this example) also captures the audio of the audio source 201. The VR content capture device 204 captures the visual imagery of the scene 200 as well as its aural scene.

The visual and audio content may be captured of the musician along with audio-capture-direction information. The audio-capture-direction information may indicate the direction towards the audio source capture devices 202, 203, 204 from the audio source 201. This information may be captured in various ways. The audio-capture-direction information may be based on one or more of: (i) information from positioning tags, such as RFID tags, and a positioning system that tracks the position of the audio source 201 and each of the audio capture devices 202, 203, 204; (ii) information from visual tracking of the position of the audio source 201 and each of the audio capture devices 202, 203, 204 from one or more cameras, optionally including the VR content capture device 204; (iii) manually entered position data of the audio source 201 and each of the audio capture devices 202, 203, 204; (iv) audio analysis of audio captured by one or more of the audio capture devices that comprise directional microphones to determine the direction towards the audio source (or apply acoustic source localization techniques to localize and track audio sources); (iv) a combination of the above or a different technique.

The form of the audio-capture-direction information may be dependent on the techniques used to capture it and the amount of processing performed during capture of the content or the amount of post processing. For example, the audio-capture-direction information may comprise the locations of one or more audio sources and one or more audio capture devices. The apparatus 100 or VR apparatus 101 may be required to determine which of the audio capture devices 100 can actually "hear" the audio from the audio source 201. In another example, the audio-capture-direction information may be pre-processed such that for each audio source 201 present in the scene 200, the directions to each of the audio capture devices 202, 203, 204 that can hear the audio is defined.

The guitar music from the musician 201 may be ongoing for a "performance" duration. The duration of the audio from the audio source 201 may be divided into one or more "performance periods" comprising predefined periods of audio. The periods of audio may be separated in any desired manner but, for example, may be separated by silence, changes in musical song, changes in the focus of dialogue (if spoken) and the like. The duration of the performance period may be determined automatically by, for example audio analysis, performer input, or manually entered. This performance period information may be associated with the VR content, or more generally, associated with the visual and audio content. The performance period information may be used to define "sections" of audio and therefore various preferences may be assigned to the sections for implementing on subsequent playback.

The audio captured by each of the audio capture devices 202, 203, 204 may form a respective audio track of the visual and audio content. By audio tracks we mean that the aural scene captured by the plurality of audio capture devices is configured such that audio (i.e. the audio track) from one of the audio capture devices may be audibly presented separately from audio captured by other audio capture devices. Thus, while in some examples, the data representing the audio from the plurality of audio capture devices may be stored separately as separate digital files, in other examples, it may be stored together. The audio from the scene 200 may include metadata or tags to define audio tracks so that audio from particular audio capture devices 202, 203, 204, from particular directions in the scene 200 (for audio captured by directional microphones) and/or from particular audio sources are extractable.

Figure 3:
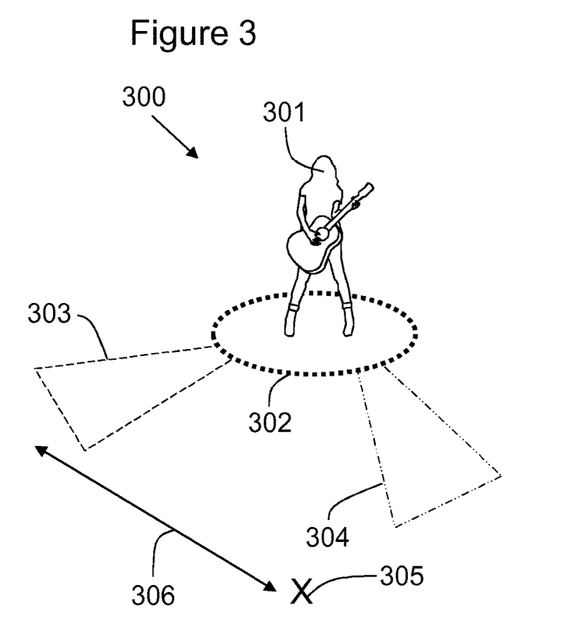
FIG. 3 illustrates the audio source of FIG. 2 as represented in the visual and audio content along with a plurality of audio-capture-location graphics.

FIG. 3 shows the display of visual and audio content and, in particular, VR content of the scene 200. The visual imagery is provided for display in a VR space 300 representative of the space of the real world scene 200. The only part of the visual imagery shown in this example, for the reason of clarity and simplicity of the drawings is the musician 201, however, it will be appreciated that the visual imagery will typically include one or more of objects and scenery, as appropriate, which is visible in the scene 200. Visual imagery of the VR content is provided for display in the VR space 300 to replicate the scene 200. As mentioned above, a user of the VR apparatus may not be able to see the entire spatial extent of the VR content at any one time and may therefore have to move a VR view to appreciate all of the spatial extent. FIG. 3 may be considered to show a VR view of the VR content displayed in the VR space. A visual representation 301 of the audio source 201 (the musician) is shown. The audio capture devices may or may not be visible, as they may be small or hidden from view or digitally removed from the VR representation of the scene 200 shown in FIG. 3.

As mentioned above, the VR content includes three audio tracks, each audio track comprising, at least in part, audio from said audio source 201 captured by a different audio capture device 202, 203, 204 located at a different location in the scene 200. The apparatus 100 has access to audio-capture-direction information indicative of at least the direction towards each of the audio capture devices 202, 203, 204 from the one or more audio sources 201.

FIG. 3 illustrates the apparatus 100 providing for display of a user selectable audio-capture-location graphic 302, 303, 304 for each of the audio tracks that represent the audio from the audio capture devices 202, 203, 204 respectively. Thus, each audio-capture-location graphic 302, 303, 304 is associated with at least one of the audio tracks. In one or more examples, where two or more audio capture devices happen to be within a particular proximity of one another, a single audio-capture-location graphic may represent the combined audio from the two or more audio capture devices. The audio-capture-location graphics are display overlaid over the visual content of the visual and audio content captured of the scene 200. The graphics may be provided in one or more of opaque form, translucent form or of outline form or in any other manner.

Each audio-capture-location graphic is visually associated with the representation of the audio source 301 in the VR content. Accordingly, the audio-capture-location graphics 302, 303, 304 are positioned to extend from and/or around the representation 301 of the audio source 201.

The position of the representation 301 of the audio source 201 in the VR content may be determined from predetermined positional data associated with the content; from visual and/or audio analysis by the apparatus 100 or other apparatus; and/or from metadata of the VR content added manually or by a positioning system which tracked the location of the audio source 201 in the scene 200.

The audio-capture-location graphics 302, 303, 304 are configured to be indicative of the direction to the audio capture device 202, 203, 204 that captured the audio track they represent. Thus, one or more of the form and position of the audio-capture-location graphics is indicative of the direction towards the audio source capture device. In the example of FIG. 3, the graphic 302 substantially surrounds the representation 301 of the audio source 201, and takes the form of a circle located at a base of the representation 301 of the audio source 201. Accordingly, having this form, it indicates that the audio capture device 202 was co-located with the audio source 202. The audio-capture-location graphics 303, 304 comprise elongate graphics that point towards the corresponding locations of the microphone array 203 and VR content capture device 204 respectively in the VR space 300. It will be appreciated that the audio-capture-location graphics could take other forms such as dots, icons or markers located at a side of the representation 301 of the audio source 201 corresponding to the side on which the audio capture device was located. In one or more examples, the audio-capture-location graphics could be animated and the animation may be indicative of the direction towards the audio capture device. In one or more examples, the audio-capture-location graphics may comprise arrows. In one or more examples, the audio-capture-location graphics may comprise dots, icons or markers positioned at the corresponding location of the audio capture device in the VR space 300. However, in one or more examples, it may be preferable for the audio-capture-location graphics to be proximal the audio source rather than the audio capture devices to ensure they are easier for the user to locate and thereby select.

The apparatus 100, based on selection of one of the audio-capture-location graphics 302, 303, 304, provides for audible presentation of the audio track associated therewith. Each audio-capture-location graphic corresponds to an audio track and therefore selection of one of the audio-capture-location graphics 302, 303, 304 provides for selection of the corresponding audio track. Thus, a user input in relation to one of the audio-capture-location graphics 302, 303, 304, causes the apparatus 100 to provide signalling to audibly present the associated audio track. In this way, a user can intuitively and effectively select to listen to audio captured from different locations in the scene. The user input may be a free space user gesture, a gesture on a touchscreen device, a voice based command, a sight based command or any other user input to make a selection of the audio-capture-location graphics 302, 303, 304.

In one or more examples, the apparatus 100, based on the user selection, is configured to provide for muting or the lowering of the volume of the other audio tracks relative to the selected audio track while audibly presenting the one selected audio track. The apparatus may be configured to provide for muting an audio track on user deselection of the corresponding audio-capture-location graphic 302, 303, 304. Thus, the apparatus 100 may provide for audible presentation of a plurality of audio tracks simultaneously based on a corresponding plurality of the audio-capture-location graphics 302, 303, 304, being user selected with the other tracks attenuated or muted.

In this example, only one audio source 201, 301 is shown. However, in other examples, a plurality of audio sources may be present in the scene 200 and therefore represented in the VR content. In one or more examples, the apparatus 100 may provide for display and selection of audio-capture-location graphics for each of the audio sources visible in the VR view. In one or more examples, the apparatus may be configured to provide for display and selection of audio-capture-location graphics based on a user selection of one of the representations of the audio sources 301. Accordingly, in one or more examples, a user picks an audio source prior to the display and selection of the audio-capture-location graphics for said audio source.

The identification of audio sources in the visual and audio content may be predetermined and provided with the visual and audio content. Such "audio source information" may be obtained from information from (i) positioning tags, such as RFID tags, and a positioning system that tracks the position of the one or more audio sources 201; (ii) information from visual tracking of the position of the one or more audio sources 201; (iii) manually entered position data of the one or more audio sources 201; (iv) audio analysis of audio captured by one or more of the audio capture devices that comprise directional microphones to determine the direction towards the one or more audio sources; (iv) a combination of the above or a different technique.

The aural scene of the visual and audio content may comprise a plurality of audio sources, possibly in addition to one or more of ambient audio, music added in post-production, and audio not identifiable with a particular audio source for whatever reason. In one or more examples, the apparatus may be configured to provide for audible presentation of the selected audio track in preference (e.g. with higher relative volume) to this "additional" audio. In one or more examples, based on user selection of one of the audio sources as represented in the visual and audio content captured of the scene 200, the apparatus 100 may be caused to provide for muting or attenuation of the audio from audio sources other than the selected audio source and optionally the other "additional" audio mentioned above. Thus, for audio captured by directional microphone arrays 203, it may be possible to extract the audio from such an audio-capture-device that has a direction directed to the audio source 201. Accordingly, it is possible for the apparatus 100 to mute audio from other sources. In other examples, the audio from a microphone physical associated with the audio source 201 may be used to generate an audio signature such that audio from other audio capture devices that does not have that signature can be muted in preference to the audio that does have such a signature. Thus, audio analysis based on the signature or otherwise can be used to improve the audibility of the audio from the selected audio source 301 over other audio. It will be appreciated that other techniques may be used.

The apparatus 100 may provide for a "VR consumption mode" in which display and selection of audio-capture-location graphics is not provided and an "audio review mode" which allows for the selection of audio sources and the display and selection of audio-capture-location graphics 302, 303, 304 (noting that the step of selecting audio sources is optional).

It will be appreciated that the audio capture devices, similar to audio capture device 204, may capture visual imagery as well as audio of the audio source 201. It would be disorienting for the apparatus 100 to provide for visual display of the visual imagery of the audio capture devices on selection of one of the audio-capture-location graphics, as the user would expect to be making a selection to hear the audio and not see the scene from a different point of view. Thus, it will be appreciated that the location of the point of view of the user in the VR space is maintained (subject to any user initiated changes) while only providing for audible presentation of audio without any visual imagery that may be captured from the same audio capture device. Accordingly, the apparatus 100 may be configured to provide for audible presentation, on selection of a corresponding graphic 302, 303, 304, of audio from each of audio capture devices without visual presentation of any visual imagery captured by the audio capture device or from the audio capture location of the audio capture device. Thus, the apparatus 100 is configured to maintain the location of the point of view in the VR content (or more generally the visual and audio content) on audible presentation of the audio from the audio capture devices.

Based on user input associated with a particular one of the audio-capture-location graphics, the apparatus may be caused to provide for audible presentation of the audio track associated therewith with a change in volume. The user input may comprise a gesture along the audio-capture-location graphic. For example, the gesture may comprise a gesture on a touchscreen device, such as a user sliding their finger along the graphic, or a free space user gesture. In one or more examples, the change in volume comprises a change in volume relative to any other audio provided for audible presentation at the same time. In one or more examples, the position of the user input on the audio-capture-location graphic provides for a predetermined change in the volume. Accordingly, a user input on the audio-capture-location graphic near to the audio source, such as by way of a sliding gesture towards the audio source, may provide for audible presentation at a greater (e.g. relative) volume than a user input on the audio-capture-location graphic further from the audio source, such as by way of a sliding gesture away from the audio source 301. Thus, the user input at a first, near to the audio source position may provide for audible presentation at a first volume and the user input at a second, further away from the audio source position may provide for audible presentation at a second volume, lower than the first volume. The audible presentation when the user input at the second, further away from the audio source position is provided may include a greater reverberation effect than any reverberation effect applied (if at all) at the first position. The position of the user input on the graphic may be configured to create the perception of the distance from which the audio source is heard.

When providing for audible presentation of the different audio tracks based on the user selection of the audio-capture-device-location graphics, some of the audio tracks may include spatial audio, such as from microphone array 203. The location of the user's point of view in the VR space, marked notionally as X 305, is some distance 306 from the corresponding location in the VR space of audio capture device 203. Thus, the audio source 201 may be heard from the right hand side from the location of audio capture device 203, for example. In some examples, the directionality of the audio of the selected audio capture device is preserved such that on selection of the corresponding graphic, the audio track is presented with the spatial audio from the point of view of the corresponding audio capture device. However, in some examples, this may be considered confusing for the user when their view of the representation of the audio source 301 from point of view 305 is in front of them. Accordingly, when providing for playback of audio tracks that are provided by audio capture devices that capture spatial audio, a spatial audio modifying effect may be used to modify the perceived aural origin of the audio source. Thus, when the audio from audio capture device 203 is played based on selection of graphic 303, the apparatus 100 may provide for modification of the spatial audio of the audio track with the spatial audio modifying effect such that the perceived aural origin of the audio matches the visually presented location of the representation of the audio source 301. The spatial audio effect may comprise a function that modifies the perceived location of the audio track. Spatial audio may be presented by headphones by using head-related-transfer-function (HRTF) filtering techniques or, for loudspeakers, by using vector-base-amplitude panning techniques to position the perceived aural origin of the audio of the audio track.

Figure 4:
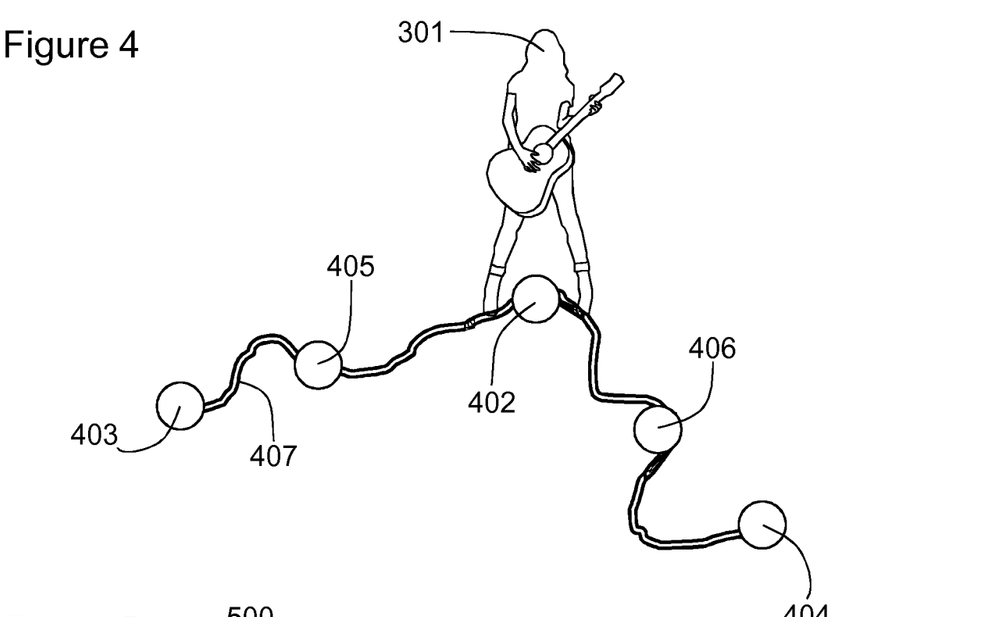
FIG. 4 illustrates a user input line extending over a plurality of audio-capture-location graphics.

FIG. 4 shows a similar VR view to FIG. 3 including the representation 301 of the audio source 201. In this example, the audio-capture-location graphics comprise markers 402, 403, 404, 405, 406 showing at least the direction towards an audio capture device that captured audio from the audio source. In this example, the audio sources represented by graphics 405, and 403 are in substantially the same direction relative to the audio source 201 but at different distances. Accordingly, the graphics 405 and 403 are shown at corresponding distances relative to the representation 301 of the audio source 201. A similar positioning of the graphics 406 and 404 is shown.

In this example, there are five different audio tracks and therefore five different "listening positions" that may be reviewed by the user. While the user may select/deselect each of the audio-capture-location graphics 402, 403, 404, 405, 406, in this example the user may provide an input to cycle through the audio tracks automatically. Thus, the apparatus 100 may be configured to receive a user input comprising the multiple selection of a plurality of audio-capture-location graphics 402, 403, 404, 405, 406. In this example, such a multiple selection comprises a user input gesture that draws a line 407 through a plurality of audio-capture-location graphics 402, 403, 404, 405, 406. The input of the line 407 may be a free space user gesture detected by one or more sensors, an input to a touchscreen device, a gaze direction command or any other suitable user input. Based on the provision of the multiple selection user input, the apparatus may be caused to provide for sequential audio presentation of the audio tracks associated with the selected plurality of audio-capture-location graphics 403, 405, 402, 406, 404. In this example, the order in which the audio tracks are played by be dependent on the order the line 407 passed through the graphics thereby leading to the audible presentation of audio tracks represented by graphic 403, then 405, then 402, then 406 and then 404. The apparatus 100 may be configured to control the duration of the audible presentation of the audio tracks based on the time it took to draw the lines through each graphic 402, 403, 404, 405, 406. Thus, the time taken to provide the selection of each graphic, e.g. the user input lingering on a first graphic for 1 second and a second for 0.5 seconds, may result in the audible presentation of the audio track associated with the first graphic for twice as long as the audio track for the second graphic, e.g. scaled up to 10 seconds versus 5 seconds, for example. In other examples, the duration may be preset.

The apparatus 100, based on a pause user input, may be configured to pause the sequential audio presentation of the audio tracks associated with the selected plurality of audio-capture-location graphics. The pause user input may comprise a predetermined gesture, keypad input or any other user input.

The ability to efficiently select different audio tracks for audible presentation may be advantageous for embodiments where the VR content and/or VR apparatus provides for free viewpoint VR. As the user may move to many different virtual locations in the VR space, the ability for a user to select or for a VR content publisher to check/modify/improve how the aural scene sounds from different virtual locations in the VR space may be advantageous. As described below, the selection of the audio-content-capture graphics 302, 303, 304, 402, 403, 404, 405, 406 may be recorded such that on subsequent consumption of the VR content the selected audio tracks may be presented by default. Accordingly, the apparatus 100 may provide for audio capture location selection or mixing of multiple audio capture locations for production of VR content.

Thus, based on selection of one or more of the audio-capture-location graphics, the apparatus 100 may be caused to provide for recordal of the one or more selected audio tracks as preferred audio tracks. The preferred audio tracks may be tagged as such as part of the visual and audio content for subsequent audible presentation of the preferred audio track by default. It will be appreciated that the designation of the preferred audio tracks may be for a user's "local copy" of the visual and audio content. In other examples, the designation of the preferred audio track may be made by a user comprising the visual and audio content publisher and therefore this default setting may be applied when watched by one or more different users at a future time. In one or more examples, unused audio tracks, based on the resulting selections, may be removed from the audio and visual content.

Thus, for audio and visual content having a preferred audio track defined, when the audio and visual content is provided for visual and audible presentation at a future time, upon presentation of the visual content of the audio source 301, the preferred audio track is provided for audible presentation in preference to audio of the audio source captured from other audio capture devices. Thus, for example, assume that audio from an audio source was captured by a lavalier microphone of the audio source as well as a more distant microphone. The audio track obtained by the lavalier microphone may be defined as the preferred audio track. Thus, the apparatus may be configured to provide the preferred audio track from the lavalier microphone in preference to the audio track from the more distance microphone, such as by muting the audio from the more distant microphone.

The apparatus may provide for designation of a preferred audio track along with a duration defining for how long it is the preferred audio track relative to the audio and visual content. For example, as mentioned above, the audio from the audio sources may be assigned performance periods and the designation of the preferred audio track may apply for one or more selected or predetermined performance periods. Alternatively, the duration may be based on a corresponding elapsed time through the visual and audio content (e.g. within a threshold of when the preferred audio track was selected), for example when the performance period information is not available. In one or more examples, the corresponding elapsed time and audio analysis of when the audio source is generating audio around said corresponding elapsed time may be used to define the duration associated with the preferred audio track.

The designation of a preferred audio track may be defined along with a virtual location or area in the VR space. Thus, the preferred audio track may be preferred based on where in the VR space the user is listening to the audio from the audio source 201. This may be advantageous as the audio from different audio capture devices may be preferable or more appropriate when the user is at different virtual points of view in the VR space. The association of the preferred audio track with a virtual location or area in the VR space may be advantageous. Further, different preferred audio tracks may be defined for different areas of the VR space. This will be explained in relation to FIG. 5 below.

In examples where the preferred audio track is defined along with a virtual location, a threshold distance from the virtual location may be used to determine where in the virtual reality space to provide the preferred audio track over other available audio. Accordingly, the preferred audio track is only presented as such if the user is within the threshold distance of the defined virtual location.

In examples where the preferred audio track is defined along with a virtual area, the apparatus 100 and/or VR apparatus 101 may provide for determination of whether or not the current location of the point of view of the user is within the virtual area to provide the preferred audio track over other available audio. Accordingly, the preferred audio track is only presented as such if the user is within the defined virtual area.

In one or more examples, the apparatus 100 is configured to provide for audible presentation of the preferred audio track based on whether or not the user is facing the audio source. Thus, when the user is facing the audio source (subject to any other conditions such as being within the virtual area) the preferred audio track is presented while when the user is not facing the audio source the audio presented may be based on standard audio rendering techniques used for the VR content when a preferred audio track selection is not available. Whether or not the audio source is in the VR view may determine whether the user is facing or not facing the audio source.

Accordingly, the VR apparatus 101 may be configured to interpret the preferred audio track information that defines, for a particular audio source, one or more preferred audio tracks for audible presentation to a user. The VR apparatus 101 may include an apparatus similar in structure to apparatus 100 for interpreting the preferred audio track information whether or not that apparatus is configured to generate the preferred audio track information itself, or just interpret it.

In one or more examples, the VR apparatus 101 may be configured to, based on visual and audio content captured of a scene, the scene comprising at least one audio source and the content including at least two audio tracks, each audio track comprising, at least in part, audio from said at least one audio source captured by a respective one of at least two audio capture devices located at different locations in the scene, and preferred audio track information defining, for a particular audio source, one or more preferred audio tracks for audible presentation to a user; provide for visual and audio display of the visual and audio content wherein the audio track defined by the preferred audio track information is provided for audible presentation in preference to the other audio tracks. As mentioned above the presentation of the preferred audio track may be based on whether the audio source is in the current view of the or whether the user is virtually within a virtual area. Thus, the presentation of the preferred audio track may be based on one or more of;

i) said audio source being visible in a view presented to the user; and
ii) a virtual point of view of the user being within a virtual area of a virtual reality space defined as part of the preferred audio track information, wherein the visual and audio content comprises virtual reality content for display in said virtual reality space.

Condition (i) above may be advantageous for conventional visual and audio content while condition (ii) may be advantageous for VR content.

Figure 5:
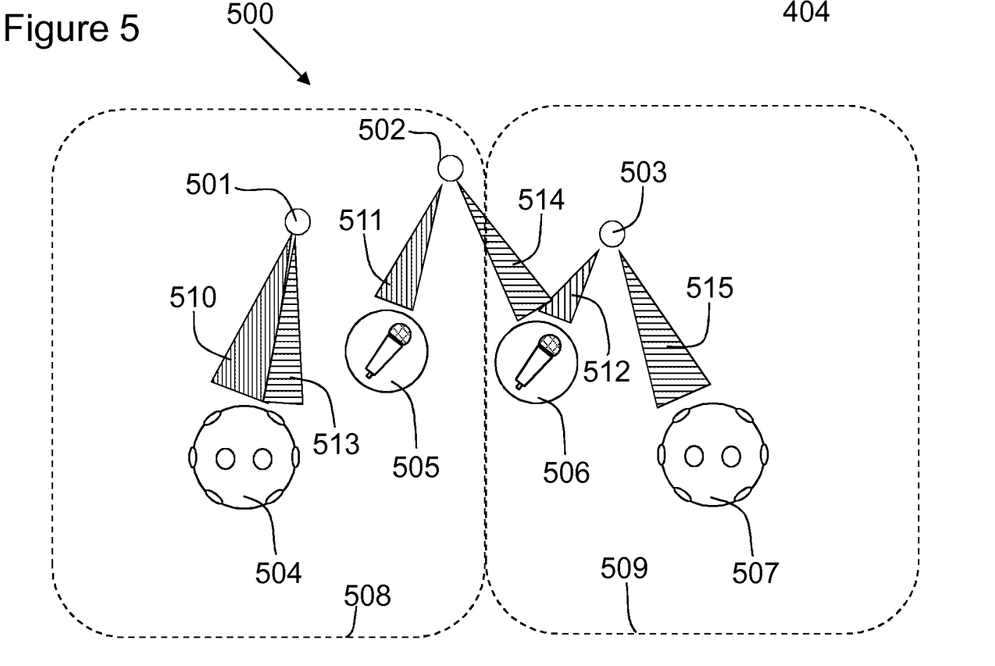
FIG. 5 illustrates an example of two specified virtual areas and the audio capture devices that receive audio from a plurality of audio sources.

FIG. 5 shows a plan view of a virtual reality space 500 in which the visual imagery of the VR content is displayed and the audio content is presented. The VR content may be free viewpoint VR content that allows for free user movement in the VR space, such as away from positions at which visual imagery was captured by VR content capture devices. The VR content is shown representing three audio sources 501, 502, 503. Icons are shown to represent the positions of audio capture devices 504, 505, 506, 507 that were present in the scene that the VR content represents. Thus, a first audio capture device 504 comprises a VR content capture device. A second audio capture device 505 and a third audio capture device 506 comprise microphones. A fourth audio capture device 507 comprises a VR content capture device.

In this example, the user has defined two virtual areas 508 and 509 in the virtual reality space. The selection of which audio tracks are the preferred audio tracks may be different in each of the areas 508 and 509. The preferred audio tracks, in this figure, are illustrated by way of the audio-capture-location graphics that are visible. Thus, when the location of the point of view of the user in the VR space 500 is within area 508, the preferred audio tracks for the audio sources 501, 502, 503 are shown by the audio-capture-location graphics having vertical patterning, namely graphics 510, 511 and 512.

Accordingly, for a user virtually located within the area 508, they will be audibly presented with the following:
a) for audio source 501, the audio track captured by the first audio capture device 504
b) for audio source 502, the audio track captured by the second audio capture device 505; and
c) for audio source 503, the audio track captured by the third audio capture device 506.

When the location of the point of view of the user in the VR space 500 is within area 509, the preferred audio tracks for the audio sources 501, 502, 503 are shown by the audio-capture-location graphics having horizontal patterning, namely graphics 513, 514 and 515.

Accordingly, for a user virtually located within the area 509, they will be audibly presented with the following:
a) for audio source 501, the audio track captured by the first audio capture device 504
b) for audio source 502, the audio track captured by the third audio capture device 506; and
c) for audio source 503, the audio track captured by the fourth audio capture device 507.

Figure 6:
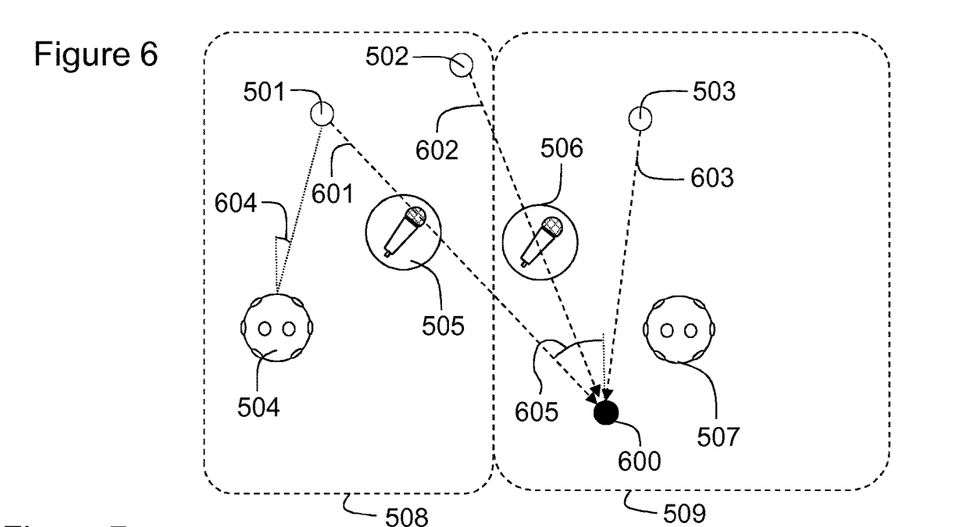
FIG. 6 illustrates the two specified virtual areas of FIG. 5 and the audio tracks provided for audible presentation in each.

FIG. 6 shows a similar view to FIG. 5 as well as the location 600 of the point of view of the user. The location 600 happens to be in area 509. The audio tracks presented based on the virtual location 600 of the point of view being in the area 509 are as explained above. However, the dashed lines 601, 602, 603 illustrate that, in one or more examples, a spatial audio effect is applied to each of the audio tracks configured such that the audio of the audio tracks is perceived as originating at the respective locations of the representations of the audio sources 501, 502, 503 in the VR content. Thus, assuming that the first audio capture device 504 captures spatial audio and therefore the audio is associated with an angle from which it was captured, the audio captured by first audio capture device 504 from the audio source 501 may be, with respect to the upward direction of the page, at approximately +20° shown by angle 604. From the location 600, the audio source 501 is at direction of approximately −40° with respect to the upward direction of the page shown by angle 605. Accordingly, a spatial audio modifying effect may be applied to modify the aural origin direction of the audio track from +20° to −40° so that it corresponds to the relative locations of the audio source 501 and the point of view 600.

Figure 7:
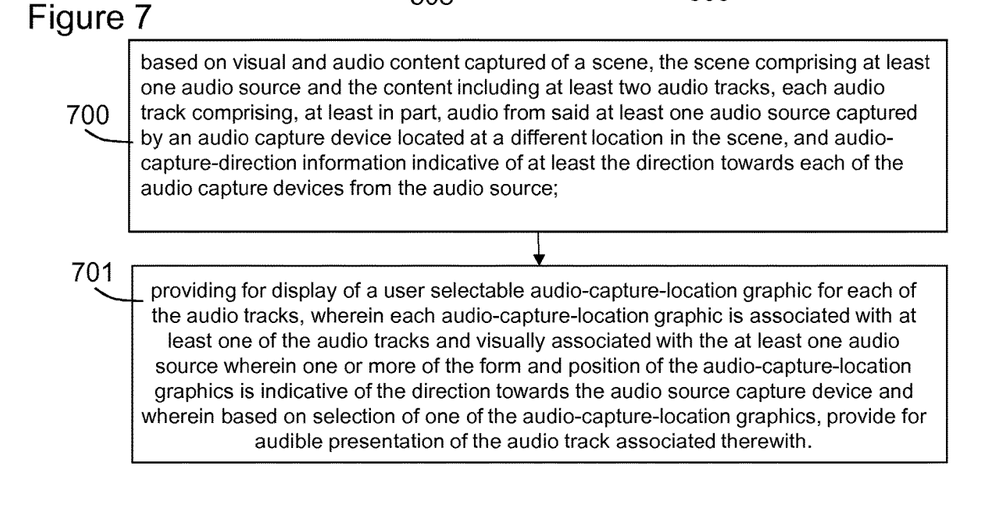
FIG. 7 shows a flowchart illustrating an example method.

FIG. 7 shows a flow diagram illustrating the steps of based on 700 visual and audio content captured of a scene, the scene comprising at least one audio source and the content including at least two audio tracks, each audio track comprising, at least in part, audio from said at least one audio source captured by an audio capture device located at a different location in the scene, and audio-capture-direction information indicative of at least the direction towards each of the audio capture devices from the audio source; providing 701 for display of a user selectable audio-capture-location graphic for each of the audio tracks, wherein each audio-capture-location graphic is associated with at least one of the audio tracks and visually associated with the at least one audio source wherein one or more of the form and position of the audio-capture-location graphics is indicative of the direction towards the audio source capture device and wherein based on selection of one of the audio-capture-location graphics, provide for audible presentation of the audio track associated therewith.

Figure 8:
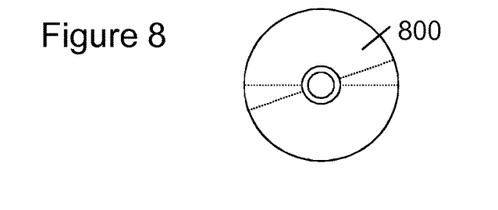
FIG. 8 shows a computer readable medium.

FIG. 8 illustrates schematically a computer/processor readable medium 800 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   receive visual and audio virtual reality content of a scene with the visual virtual reality content configured display in a three-dimensional virtual reality space by the apparatus, the scene comprising at least one audio source viewable from a plurality of virtual points of view within the virtual reality pace, and the virtual reality content including the audio virtual reality content including:
      at least two audio tracks, each audio track comprising, at least in part, audio from said at least one audio source captured by a respective one of at least two audio capture devices located at different locations in the scene, and
      audio-capture-direction information indicative of at least the direction towards each of the audio capture devices from a respective audio source of the at least one audio source;
   based on the visual and audio virtual reality content, provide for display of a user selectable audio-capture-location graphic for each of the audio tracks, wherein each audio-capture-location graphic is associated with at least one of the audio tracks and visually associated with the at least one audio source as represented in the visual virtual reality content wherein one or more of the form and position of the audio-capture-location graphics is indicative of the direction towards the audio source capture device, and
   based on selection of one or more of the audio-capture-location graphics, provide for audible presentation of the audio track associated therewith and for recordal of the one or more selected audio tracks as preferred audio tracks at one of or a subset of the plurality of virtual points of view for subsequent audible presentation of the preferred audio track(s) by default to one or more of the user or a different user when presenting the visual and audio virtual reality content, at a future time, from said one of or the subset of the plurality of virtual points of view.

2. The apparatus of claim 1, wherein, on selection of the one of the audio-capture-location graphics, the audio track associated therewith is provided for audible presentation in preference to audible presentation of the other audio tracks.

3. The apparatus of claim 1, wherein the apparatus is configured to provide for display of the user selectable audio-capture-location graphics further based on user selection of the audio source as represented in the visual and audio virtual reality content of the scene.

4. The apparatus of claim 3, wherein based on user selection of the audio source as represented in the visual and audio virtual reality content of the scene, the apparatus is caused to provide for muting of the audio, as represented in the visual and audio virtual reality content, from audio sources other than the selected audio source.

5. The apparatus of claim 1, wherein based on user input associated with a particular one of the audio-capture-location graphics, the apparatus is caused to provide for audible presentation of the audio track associated therewith with a change in volume.

6. The apparatus of claim 1, wherein the user selection of one of the audio-capture-location graphics comprises part of a user selection that includes a plurality of audio-capture-location graphics and the apparatus is caused to provide for sequential audio presentation of the audio tracks associated with the selected plurality of audio-capture-location graphics.

7. The apparatus of claim 1, wherein a virtual reality view presented to the user provides for viewing of at least a spatial portion of the virtual reality content at any one time.

8. The apparatus of claim 1, wherein providing for the audible presentation of the audio track comprises providing for audible presentation of the audio track with a spatial audio effect such that a perceived aural origin of the audio of the audio track corresponds to a position of the audio source as represented in the visual content of the scene.

9. The apparatus of claim 1, wherein the visual and audio virtual reality content comprises free view point virtual reality where the user is free to control their virtual location in the three-dimensional virtual reality space.

10. The apparatus of claim 1, wherein the apparatus is further caused to provide for recordal of the selected audio track as a preferred audio track for a specified virtual area in the virtual reality space, for subsequent audible presentation of the preferred audio track by default to one or more of the user or a different user when watching the visual and audio content from within said specified virtual area at the future time.

11. The apparatus of claim 1, wherein the audio-capture-location graphics are provided for display overlaid over the visual content of the visual and audio virtual reality content of the scene.

12. A method comprising:
   receive visual and audio virtual reality content of a scene with the visual virtual reality content configured for display in a three-dimensional virtual reality space, the scene comprising at least one audio source viewable from a plurality of virtual points of view within the virtual reality space and the virtual content including the audio virtual reality content including:
      at least two audio tracks, each audio track comprising, at least in part, audio from said at least one audio source captured by a respective one of at least two audio capture devices located at different locations in the scene, and
      audio-capture-direction information indicative of at least the direction towards each of the audio capture devices from a respective audio source of the at least one audio source;
   based on the visual and audio content, providing for display of a user selectable audio-capture-location graphic for each of the audio tracks, wherein each audio-capture-location graphic is associated with at least one of the audio tracks and visually associated with the at least one audio source as represented in the visual virtual reality content wherein one or more of the form and position of the audio-capture-location graphics is indicative of the direction towards the audio source capture device; and based on selection of one or more of the audio-capture-location graphics, providing for audible presentation of the audio track associated therewith and for recordal of the one or more selected audio tracks as preferred audio tracks at one of or a subset of the plurality of virtual points of view for subsequent audible presentation of the preferred audio track(s) by default to one or more of the user or a different user when presenting the visual and audio virtual reality content, at a future time, from said one of or the subset of the plurality of virtual points of view.

13. The method of claim 12, wherein, on selection of the one of the audio-capture-location graphics, the audio track associated therewith is provided for audible presentation in preference to audible presentation of the other audio tracks.

14. The method of claim 12, further comprising providing for display of the user selectable audio-capture-location graphics further based on user selection of the audio source as represented in the visual and audio virtual reality content of the scene.

15. The method of claim 14, wherein based on user selection of the audio source as represented in the visual and audio virtual reality content of the scene, further comprising providing for muting of the audio, as represented in the visual and audio virtual reality content, from audio sources other than the selected audio source.

16. The method of claim 12, wherein based on user input associated with a particular one of the audio-capture-location graphics, further comprising providing for audible presentation of the audio track associated therewith with a change in volume.

17. The method of claim 12, wherein the user selection of one of the audio-capture-location graphics comprises part of a user selection that includes a plurality of audio-capture-location graphics and the method further comprises providing for sequential audio presentation of the audio tracks associated with the selected plurality of audio-capture-location graphics.

18. A non-transitory computer readable medium comprising program instructions stored thereon for performing at least the following:
  receive visual and audio virtual reality content of a scene with the visual virtual reality content configured for display in a three-dimensional virtual reality space, the scene comprising at least one audio source viewable from a plurality of virtual points of view within the virtual reality space, and the virtual reality content including the audio virtual reality content including:
    at least two audio tracks, each audio track comprising, at least in part, audio from said at least one audio source captured by a respective one of at least two audio capture devices located at different locations in the scene, and
    audio-capture-direction information indicative of at least the direction towards each of the audio capture devices from the audio source;
  based on the visual and audio content, provide for display of a user selectable audio-capture-location graphic for each of the audio tracks, wherein each audio-capture-location graphic is associated with at least one of the audio tracks and visually associated with the at least one audio source as represented in the visual virtual reality content wherein one or more of the form and position of the audio-capture-location graphics is indicative of the direction towards the audio source capture device; and
  based on selection of one or more of the audio-capture-location graphics, provide for audible presentation of the audio track associated therewith and for recordal of the one or more selected audio tracks as preferred audio tracks at one of or a subset of the plurality of virtual points of view for subsequent audible presentation of the preferred audio track(s) by default to one or more of the user or a different user when presenting the visual and audio virtual reality content, at a future time, from said one of or the subset of the plurality of virtual points of view.

19. An apparatus comprising:
at least one processor; and
at least one memory including computer program code,
the at least one memory and the computer program code configured to, with the at least one processor, cause the apparatus to perform at least the following:
receive visual and audio virtual reality content of a scene, the scene comprising at least one audio source and virtual reality content including the audio virtual reality content including:
  at least two audio tracks, each audio track comprising, at least in part, audio from said at least one audio source captured by a respective one of at least two audio capture devices located at different locations in the scene, and
  preferred audio track information defining, for a particular audio source, one or more preferred audio tracks for audible presentation to a user, by default, at one of or a subset of a plurality of virtual points of view; and
provide for visual and audible presentation of the visual and audio virtual reality content in a three-dimensional virtual reality space, wherein the at least one audio source is viewable from a plurality of virtual points of view within the virtual reality space, and wherein, based on a current virtual point of view of the user being at said one of or a subset of a plurality of virtual points of view, the one or more audio tracks of the audio virtual reality content defined by the preferred audio track information is provided for audible presentation in preference to the other audio tracks.

20. The apparatus of claim 19, wherein the preferred audio track information defines, for a particular audio source, one or more preferred audio tracks for audible presentation to a user, by default, when located in a specified virtual area in the virtual reality space, the provision, by the apparatus, for visual and audio display of the visual and audio virtual reality comprising audible presentation of the one or more audio tracks defined by the preferred audio track information in preference to the other audio tracks based on the current location of the user being within said specified virtual area.

* * * * *